Jan. 26, 1960  F. O. E. SCHULTZ  2,922,678
POWER BRAKE SYSTEM
Filed Nov. 23, 1956  4 Sheets-Sheet 1

Fig.1

INVENTOR.
FORREST O. E. SCHULTZ
BY

ATTORNEY.

Jan. 26, 1960  F. O. E. SCHULTZ  2,922,678
POWER BRAKE SYSTEM

Filed Nov. 23, 1956  4 Sheets-Sheet 2

INVENTOR.
FORREST O. E. SCHULTZ
BY

ATTORNEY.

Jan. 26, 1960  F. O. E. SCHULTZ  2,922,678
POWER BRAKE SYSTEM
Filed Nov. 23, 1956  4 Sheets-Sheet 4

INVENTOR.
FORREST O. E. SCHULTZ
BY

ATTORNEY.

United States Patent Office 2,922,678
Patented Jan. 26, 1960

2,922,678

POWER BRAKE SYSTEM

Forrest O. E. Schultz, Detroit, Mich., assignor to Midland-Ross Corporation, a corporation of Ohio Application November 23, 1956, Serial No. 623,838

8 Claims. (Cl. 303—29)

My invention relates to brakes and more particularly to an improved fluid pressure brake system for trucks and tractor-trailer combinations.

In the application of brake means to heavy vehicles such as trucks and trailers the brake pressure required to stop the vehicle is such that manual effort alone is insufficient and power braking means is required. Since the driver must depend upon power means to stop the vehicle the protection of the system to avoid loss of power braking for a fault in the system is critical and a number of devices have been proposed to effect proper protection.

In practice it is conventional to provide in the power brake system an emergency relay valve to throw the tractor or trailer or both into full emergency braking immediately upon development of a fault in the system causing loss of fluid pressure in the supply lines thereof below a predetermined value.

One difficulty resulting from the immediate application of full emergency braking in protecting the system is the complete loss of driver control over the tractor and trailer once the brakes go into emergency operation. That is, upon automatic emergency brake application the brakes are fully applied, and the driver has no control of the same. Should the tractor-trailer combination be on a curve or making a turn, this could cause jackknifing of the tractor and trailer. Should traffic be heavy or should the truck be just over the knoll of a hill a rear-end collision may result. Should the road be slippery an uncontrolled skid could result.

A further disadvantage of conventional systems is that once emergency brake application is in effect there is no way to release the brakes to quickly move the vehicle from a location involving hazard.

It is an object of my invention to provide an improved air brake system for vehicles.

Another object of my invention is to provide in a brake system an improved emergency relay means of the type adapted to provide a partial brake application or brake drag dependent in force of brake application upon the loss of pressure incurred in the system.

A further object of my invention is to provide an improved brake system including means effective to prevent movement of the vehicle until sufficient air pressure is established in the system for adequate braking.

Another object of my invention is to provide in a power braking system improved means for effecting release of the brakes for moving the vehicle subsequent to emergency brake application.

A further object of my invention is to provide a system whereby for any single failure in the system, braking can be lost on only one load axle of the tractor or trailer. By load axle here is meant all braking axles with the exception of the steering axle.

A still further object of my invention is to provide for a brake system as above described an improved reliable relay requiring minimum maintenance.

Further objects and advantages will be apparent from the following description and accompanying drawings of a preferred embodiment of my invention, in which.

Figure 1:
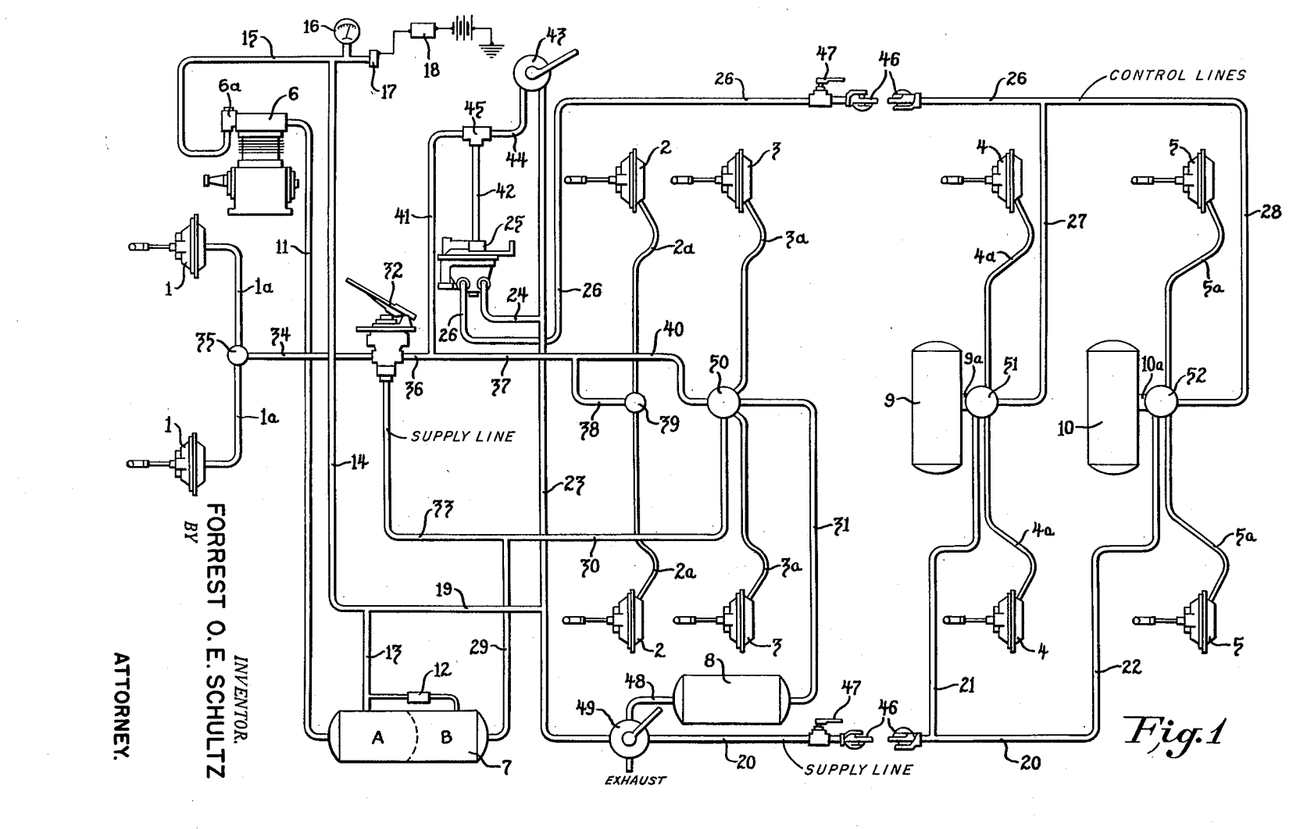
Figure 1 is a diagrammatic view of a power brake system incorporating my invention.

Referring to Figure 1 of the drawing, I have shown therein a power brake system illustrative of my invention as applied to a tractor and semi-trailer, the tractor having a steering axle associated with brake chambers 1 and connecting air lines 1a, rear tandem load axles associated respectively with brake chambers 2 and 3 and connecting lines 2a and 3a, and the trailer having rear tandem load axles associated respectively with brake chambers 4 and 5 and associated brake lines 4a and 5a. The axles and wheels of the vehicle have not been shown to avoid complication of the drawing.

Air under pressure is supplied for the fluid actuated brake chambers from a compressor indicated at 6 which is mounted on and arranged for belt drive from the tractor in a conventional manner. Also mounted on the tractor I provide a reservoir 7 having a primary chamber A and a secondary chamber B together with a single chamber reservoir 8. Two single chamber reservoirs 9 and 10 are mounted on the trailer. Air under pressure is supplied by way of an output line 11 directly to the primary chamber A of reservoir 7 and from chamber A to secondary chamber B by way of a check valve 12 and connections which prevent drain of chamber B to chamber A.

Primary chamber A is connected through supply lines 13, 14 and 15 to a compressor governor 6a for controlling the air pressure in chambers A and B of reservoir 7, and to a pressure gauge 16 indicating the supply line pressure in chamber A. A conventional pressure responsive electrical switch 17 is arranged to actuate a warning buzzer 18 on abnormally low air pressure in chamber A.

From a consideration of Figure 1 it will be noted that reservoir 7 on the tractor after being charged with compressed air from the compressor 6 becomes a source of both supply and control pressure for the truck and trailer, chamber A being particularly associated with the trailer brake system and chamber B being particularly associated with the tractor brake system.

More particularly chamber A is a source of supply pressure to the trailer reservoirs 9 and 10 through supply lines 13, 19, 20, 21 and 22 and a source of control line pressure through supply lines 13, 19, 23 and 24, a trailer break-a-way valve 25, and a trailer control line 26 to branch control lines 27 and 28 associated respectively with the brake chambers 4 and 5.

Chamber B is a source of supply pressure to the tractor reservoir 8 through supply lines 29, 30 and 31 and to a conventional treadle valve 32 through supply lines 29 and 33.

Treadle valve 32 upon manual operation supplies air pressure to the brake chambers 1 through a line 34 and a conventional quick release valve 35 and to brake chambers 2 through lines 36, 37 and 38 and a conventional quick release valve 39. Treadle valve 32 upon manual operation also supplies control pressure to a control line 40 associated with brake chambers 3 through lines 36 and 37 and to the tractor break-a-way valve 25 through line 36 and lines 41 and 42. The tractor break-a-way valve 25, treadle valve 32 and quick release valves 35 and 39 are all conventional and well-known in the art. A detailed description of each is not considered necessary. The treadle valve operates upon depression of the treadle to pass fluid under pressure from supply line 33 to control lines 34 and 36 and upon release to exhaust pressure from lines 34 and 36. The quick release valves 35 and 39 are provided as means close to the brake chambers for more rapidly dumping pressure from the brake chambers upon loss of pressure in lines 34 and 36. The tractor break-a-way valve 25 is responsive to control pressure through lines 41 and 42 to pass air pressure from supply line 24 to control line 26 for supplying control line pressure to the trailer and upon break-a-way of the trailer from the tractor the valve 25 serves to isolate the tractor brake system from the trailer brake system in the usual manner avoiding loss of fluid pressure in chamber B associated with the tractor brake system.

A conventional hand valve 43 is connected between supply line 23 and the break-a-way control valve control line 42 through a line 44 and a two-way check valve 45 in conventional manner to provide for operation of the valve 25 either from the treadle valve 32 or the hand valve 43 such that upon failure in any part of the control line system on the tractor the trailer brakes may be operated manually by hand valve 43.

The usual quick couplings 46 and shut-off valves 47 are provided in the supply line 20 and control line 26 leading to the trailer.

The various individual elements of the system thus far disclosed are conventional. The overall system differs in one aspect from conventional systems in the provision of improved relay means associated with the sets of brake chambers 3, 4 and 5 and cooperative in a novel manner with the remainder of the system to provide an improved brake system. Details of the improved relay valves and their cooperation with the overall system to produce the objects and advantages heretofore described will now be set forth.

In accordance with my invention I provide on a tractor an improved relay valve 50 adapted for connection to control line 40, supply line 30, reservoir line 31 and brake chamber lines 3a. I provide identical valves 51 and 52 for connection to the supply, control, reservoir and brake chamber lines associated respectively with the sets of brake chambers 4 and 5 on the trailer.

Each of the relays 50, 51 and 52 are identical and hence a description of one will suffice. In general the modulating relay 50 comprises a main housing, a supply valve cartridge detachably connected in the housing and arranged to control the admission of fluid under pressure to the housing, a differential pressure responsive means for actuating the supply valve as well as controlling the exhaust of fluid under pressure from the brake chambers, and a pressure responsive valve means having a housing connected to the main housing and arranged to actuate the supply valve automatically independent of manually applied control pressure and to apply a brake pressure varying inversely as a function of supply line pressure below a predetermined pressure.

Figures 2, 3:
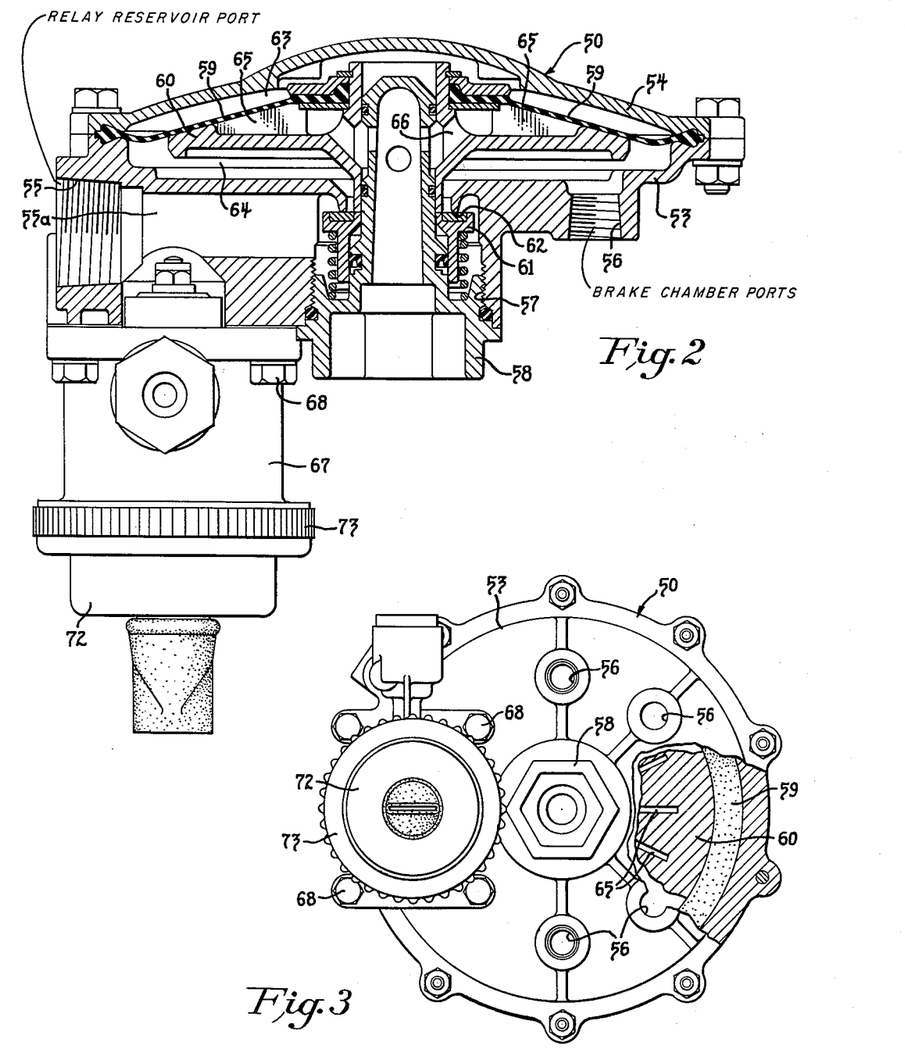
Figure 2 is a cross sectional view of an emergency relay valve illustrative of one aspect of my invention.
Figure 3 is a bottom plan view of Figure 2.

More particularly referring to Figures 2 and 3, I provide a main housing 53 having a cover plate 54 attached thereon by bolts and nuts or other suitable means, a threaded port 55 for connecting the relay valve 50 to its associated air reservoir 8 through line 31, threaded brake ports 56 for connection to associated brake chamber lines 3a and a centrally located threaded aperture 57 for receiving a hollow guide member 58 of a detachable supply valve cartridge. Within the main housing 53 and cover plate 54 I provide a differential pressure responsive flexible diaphragm assembly 59 secured at its outer periphery between flanged portions of the main housing 53 and cover 54 and at its inner periphery to a centrally apertured valve actuator 60 slidable on the guide member 58 to engage and actuate an annular supply or inlet valve 61 slidably mounted on the guide member and spring biased to closed position on an annular lip valve seat 62 formed in the main housing 53. The diaphragm assembly 59 and valve actuator 60 divide the main housing into a control chamber 63 and a reaction chamber 64. Referring to Figures 2 and 3 the valve actuator 60 is radially slotted as at 65 and centrally apertured as at 66. Responsive to a predominating pressure in the reaction chamber 64 the diaphragm assembly 59 and valve actuator 60 move upward to allow the supply valve 61 to close and the flexible diaphragm 59 to lift from the actuator 60 to exhaust air from the reaction chamber 64 through slots 65, apertures 66 and the hollow interior of guide member 58. On a predominating pressure in the control chamber 63 the valve actuator 60 moves downward to engage and open the supply valve 61 and fluid pressure in the reaction chamber 64 is prevented from exhausting by the flexible diaphragm fluid biased on the slots 65. Complete details of the above described portion of my relay valve are not considered necessary here as they are fully described in my co-pending application Serial No. 477,652 filed December 27, 1954 and now Patent No. 2,883,997.

Figures 4, 5:
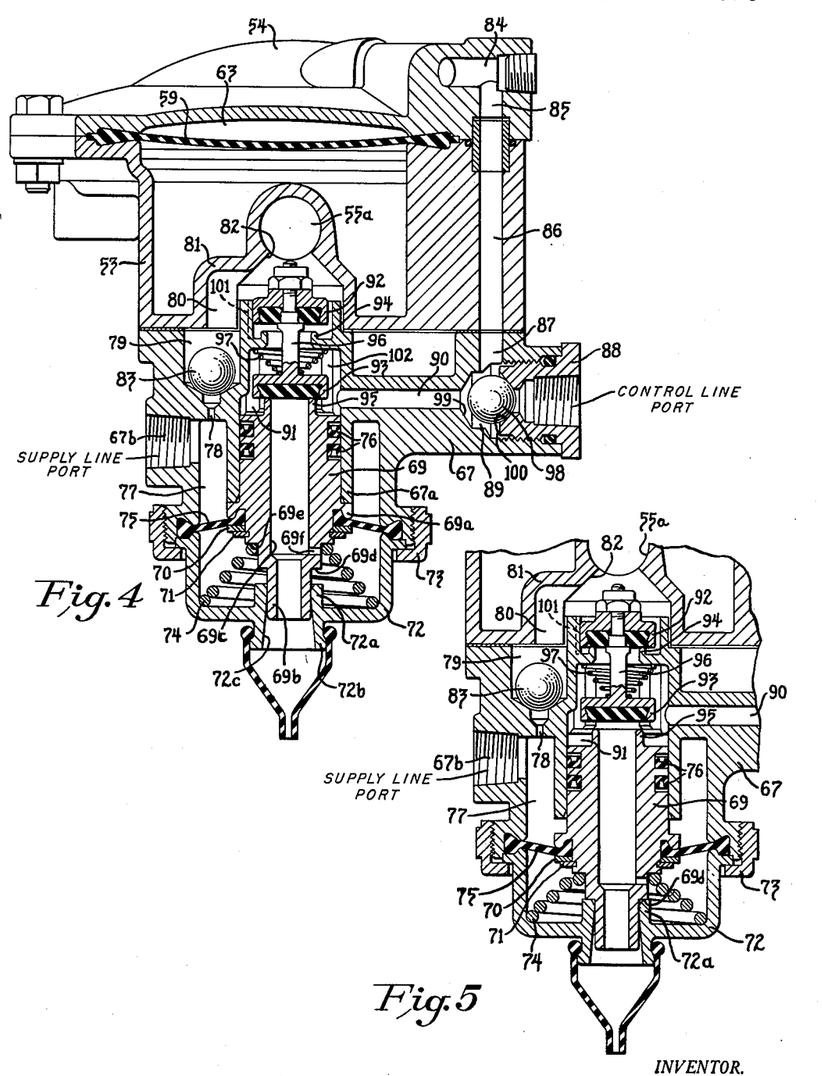
Figure 4 is a cross sectional view of a part of Figure 2 showing in cross section a modulating valve portion of the relay under condition of zero fluid pressure in the system or under emergency brake applying condition.
Figure 5 is a view similar to Figure 4 showing the modulating valve in normal braking position.
Figure 6:
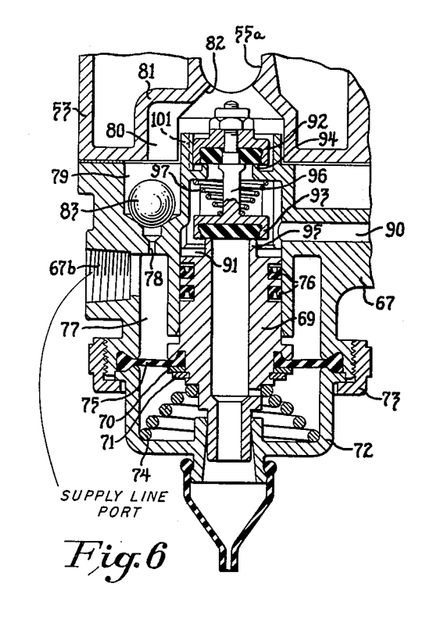
Figure 6 is a view similar to Figure 4 showing the modulating valve in position of emergency brake application lap condition.

Referring to Figure 2 the improved portion of my relay comprises a hollow housing 67 secured to the main housing 53 by bolts 68 or other suitable means, and additional elements best seen in Figures 4, 5 and 6.

Referring to Figure 4 I provide in the housing 67 a valve actuator 69 slidable in a centrally located longitudinally positioned cylindrical wall section 67a of the housing and flanged as at 69a to form a stop means for inward movement of the valve actuator. To move the valve actuator responsive to differential fluid pressure I provide an annular flexible diaphragm 75 having its inner periphery secured to the actuator 69 adjacent its shoulder 69a by a washer 70 and snap ring 71 and its outer periphery secured between the housing 67 and a cup shaped cover 72 in turn secured to the housing by a flanged nut 73 or other suitable means. The cover 72 is flanged as at 72a and 72b and centrally apertured as at 72c to slidably guide an outer end 69b of reduced cross section of the valve actuator 69 and to pass air to the atmosphere from an aligned central longitudinal passage 69c of the actuator 69. Flange 72a also acts as a stop member for outward movement of the actuator 69 by engagement with a second shoulder 69d of the actuator. A compression spring 74 is provided between the cover 72 and a third shoulder 69e of the actuator to bias the actuator in an inward direction. A radially positioned breather port 69f is provided in the actuator 69 to avoid trapping of air between the diaphragm and cover plate. Opposed annular chevron seals 76 are positioned in spaced annular grooved portions of the actuator to prevent the passage of fluid pressure between the wall 67a of the housing and the valve actuator.

The diaphragm 75, housing 67 and valve actuator 69 form within the housing 67 a supply chamber 77 having communication with its associated supply line 30 through a threaded port 67b adapted for connection to the supply line.

Referring to Figure 1 for the moment it will be noted that the modulating relays 50, 51 and 52 are connected respectively to associated reservoirs 8, 9 and 10 through line 31 and short couplings 9a and 10a. Referring to Figure 2 the port 55 is the reservoir connection. Referring again to Figure 1 the relays 50, 51 and 52 are connected respectively to supply lines 30, 21 and 22. Referring to Figure 4 the connection is by way of the supply port 67b.

In order to pass fluid under pressure from the supply line to the reservoir I provide (Figure 4) in the housing 67 a restricting orifice 78 communicating with a recess chamber 79 formed in the housing 67 and a recess chamber 80 formed in the main housing 53 by a web partition 81. The web 81 is apertured as at 82 to provide communication between chamber 80 and a reservoir passage identified as 55a in Figures 2 and 4. Thus fluid under pressure is free to pass from the supply line to the reservoir through the restricted orifice 78. The restricted orifice is important in one aspect of my invention as regards axle by axle protection afforded by the overall system. This will be explained more fully hereinafter. To prevent a fault in the supply line from exhausting the reservoir I provide a one-way ball check 83 adapted to seat and close the orifice 78 upon a supply line pressure lower than reservoir pressure.

Referring to Figure 4 I provide in the cover 54, main housing 53 and housing 67 communicating passages 84, 85, 86 and 87 as indicated in the drawing and in the housing 67 an internally and externally threaded adapter 88 arranged for connection to the control line 40 to supply control line pressure to the control pressure chamber 63 through manually operated valve means. Upon application of control line pressure by operation of the foot treadle 32 or hand valve 43 fluid under pressure is directed to the control pressure chamber 63 to actuate the brakes. Thus, brake chambers 3, 4 and 5 associated respectively with relays 50, 51 and 52 may under normal operating conditions be operated responsive to a manually actuated means.

Referring to Figure 4, adjacent the adapter 88 I provide in the housing 67 a recess forming a chamber 89 and a passage 90 communicating with an annular valve chamber 91 adjacent the inward end of the actuator 69. Coaxially aligned with the valve actuator 69 I provide an inlet or supply valve 92 and an exhaust valve 93 adapted to seat respectively upon an inlet seat 94 formed on a lipped portion of the housing 67 and an exhaust valve seat 95 formed on a projecting end of the valve actuator 69. Valves 92 and 93 are connected by a rod 96 to move as an integral unit and are spring biased to closed position of the valve 92 by a compression spring 97. A plurality of angularly spaced ribs 101 and 102 formed on the housing 67 act respectively as guide means for the valves 92 and 93. As will be described in detail hereinafter the passage 90 is provided to pass a controlled fluid pressure to the control chamber 63 to apply the brakes responsive to loss in fluid pressure in the supply line and is alternative in function to the passage of control pressure from the control line to the control chamber 63 responsive to movement of a manually actuated means. In view of the above-mentioned alternative function to pass fluid under pressure to control chamber 63 from either the control line or from the passage 90, means to prevent the passage of fluid pressure between the control line and the passage 90 are provided in the chamber 89 in the form of a ball check valve 98. The check valve is adapted to seat on a valve seat 99 formed in the chamber 89 adjacent the passage 90 or alternatively upon an opposed valve seat 100 formed on the adapter 88 adjacent the control line connection.

Operation

Referring to Figure 1 and considering now the operation of the above described system and the improved relay valves 50, 51 and 52, fluid under pressure is supplied from the compressor 6 through chambers A and B of the reservoir 7 to the treadle valve 32, the break-a-way valve 25, the hand valve 43 and the supply lines 30, 21 and 22 associated respectively with the relay valves 50, 51 and 52.

Referring to Figure 4 the supply line fluid under pressure enters each of the relay valves through the supply line port 67b to the chamber 77 and thence through orifice 78, recess 79, recess 80, aperture 82 and reservoir passage 55a (Figure 2) to the reservoirs 8, 9 and 10 associated with the respective relays 50, 51 and 52. As fluid pressure is increased from zero in the supply lines by starting the truck motor and driving the compressor 6, part of the fluid under pressure is passed to the reservoirs 8, 9 and 10 as above described to bring the reservoirs up to full pressure.

However, referring to Figure 4, since inlet valve 92 is open and exhaust valve 93 is closed, part of the fluid under pressure admitted to recess 80 is passed by inlet valve 92 to passage 90 leading to the control chamber 63 to actuate the brake chambers. During this changing cycle the fluid pressures in the reservoir, brake control chamber 63 and supply line are increased substantially equally and braking pressure in the brake chambers 3, 4 and 5 is gradually increased preventing movement of the vehicle until a predetermined safe operating pressure is established in the system.

When a predetermined safe pressure, say 55 lbs. for example, is obtained in the supply line such pressure prevailing in chambers 77 and 91 acts upon adjacent surfaces of the diaphragm 75 and actuator 69 to close inlet valve 92 and open exhaust valve 93 against the bias of spring 74 as shown in Fig. 5. Under these conditions fluid pressure in the control chamber 63 is exhausted by way of passages 84—87, 90 and 69c to release the formerly applied brake chambers 3, 4 and 5. The vehicle is now ready for movement, a sufficient fluid pressure having been obtained in the reservoirs and supply lines for adequate braking.

This feature of my invention is important in practical operation of a truck and trailer in that it is an assurance that the vehicle will not be set in motion by an impatient or careless driver until at least adequate fluid pressure is attained for safe braking of the vehicle.

Continued operation of the vehicle results in further charging of the supply lines and reservoirs until they are fully charged at say 100 lbs. pressure. The vehicle is now under normal operating condition.

Referring to Figure 1 under normal foot pedal operation of the subject system depression of the treadle 32 applies fluid under pressure to all brake chambers 1, 2, 3, 4 and 5 proportional to the extent to which the treadle 32 is depressed. More particularly, fluid under pressure is applied to chambers 1 and 2 through conventional quick release valves 35 and 39 respectively. Fluid under pressure is applied to brake chambers 3 through the relay 50 fed with control pressure from the treadle 32 by way of control lines 36, 37 and 40, and fluid under pressure is applied to chambers 4 and 5 through relays 51 and 52 respectively fed with control pressure from the conventional break-a-way valve 25 in turn actuated by control pressure from the treadle 32. The above is a normal operation of the system under no fault condition in which check valve 98 will close passage 90.

Loss of supply line pressure through a fault in the system if allowed to continued may ultimately lower supply pressure to a value at which adequate braking is not available. Along with many other causes, such loss of pressure may occur by way of a leak in one of the supply lines of the system, by way of a leak in a control line and frequent or prolonged brake application and by way of a broken belt on the compressor.

Referring to Figures 5 and 6 in the event of loss of pressure in the supply line system, no emeregency braking takes place until the supply pressure is lowered to some predetermined value as for example 45 lbs. At such value of fluid pressure in the chamber 77 the force of the diaphragm 75 in maintaining the valve actuator 69 in outward position as in Figure 5 is overcome by the force of spring 74 and the valve actuator 69 moves inward closing the exhaust valve 93 and opening the inlet valve 92 as in Figure 4. Valve 92 being open, fluid pressure from the reservoir associated with the relay valve passes through the passage 55a, aperture 82 and past valve 92 to annular chamber 91 and thence through passage 90 to close check valve 98. Thereafter fluid pressure is conveyed through passages 87, 86, 85 and 84 to the control chamber 63 to apply the brake chambers in the manner previously described to initiate emergency braking. However, the pressure admitted to chamber 91 acts directly on the valve actuator 69 to supplement the force created by the lowered fluid pressure in chamber 77 acting on diaphragm 75 to thereby close supply valve 92 and retard additional emergency braking. Exhaust valve 93 remains closed due to the pressure of spring 97 and the fluid differential pressure on the valve 93. The valves 92 and 93 are now in lap position, both valves being closed as shown in Figure 6 and a partial braking effort is established depending upon the value to which the supply line pressure has been lowered in chamber 77. Further reduction in supply line pressure repeats the operation opening control valve 92 to trap a higher pressure in chamber 91, such additional pressure being required to supplement the further decreased pressure in chamber 77 in closing valve 92 and additional brake pressure is thereby applied. In the present preferred embodiment of my invention it appears that a curve of emergency brake application from zero to full braking corresponding progressively to a drop in supply line pressure from 45 lbs. to zero is satisfactory. However, the specific values can readily be changed by changes in the rate of spring 74 and/or other changes in dimension provided that the effective areas of actuator 69, the opening afforded by the valve seat 94, and the diaphragm 75 are maintained in a particular relation to each other. The reason for this becomes apparent by considering the relative sizes of the parts in the valve arrangements shown in Figs. 4, 5 and 6 in which the effective pressure responsive area of actuator 69 is greater than the area of valve seat 94 and less than the effective area of the diaphragm 75. When the pressure in supply chamber 77 drops below a safe operating pressure of 45 p.s.i., for example, the spring 74 exerts a force to open the valve 92 which is held on its seat by the reservoir pressure in chamber 80 acting on the valve 92 over an area determined by the diameter of the valve seat 94. As soon as the valve 94 opens, reservoir fluid under pressure in chamber 80 acts over the effective area of the actuator 69. Since this area is greater than the area of the valve seat 94, the force on the actuator 69, together with pressure acting on the diaphragm 75, is effective to return the actuator 69 against the spring 74 so that the valve 92 moves to a closed position in readiness to open again when the supply pressure drops an additional amount. In other words, the force produced on actuator 69 must be greater than the force on valve 92 which was overcome to open the valve. If the two areas were equal, the force necessary to return the actuator 69 to close the valve 92 would not be developed. Consequently, once the valve 92 was opened, it would remain open so the pressure from the reservoir would be applied to the chamber 63 and a maximum brake application would result. To get a gradual increase in braking force as the supply pressure decreases below predetermined minimum, it is necessary for the valve 92 to be opened and closed a number of times until the supply pressure is completely exhausted.

It is also necessary for the area of actuator 69 to be smaller than the effective area of diaphragm 75. As the areas approach each other in size, a complete loss of supply pressure in the chamber 77 would result in only a small portion of the reservoir pressure in chamber 80 being admitted to the control chamber 63, since the relatively great pressure in the chamber 80 would be effective on the actuator 69 to counteract or balance the spring 74. In like manner, as the area of actuator 69 becomes very small relative to the area of diaphragm 75, the force created by reservoir pressure in chamber 80 has only a small effect on the actuator 69. This results in almost a full emergency brake application any time the pressure in the supply chamber 77 drops slightly below the predetermined minimum.

In the actual embodiment of the invention as illustrated in Figs. 4, 5 and 6, it has been found that for a given spring value and with the effective area of actuator 69 greater than the area encompassed by the valve seat 94 and slightly less than one-half of the effective area of diaphragm 75, the emergency brakes will be applied with a pressure which increases from zero or atmospheric to approximately 75 p.s.i. as the supply pressure in chamber 77 changes in a range between the predetermined minimum pressure of 45 p.s.i., for example, to zero or atmospheric.

In accordance with one aspect of my invention I have provided an improved relay capable of applying, holding and releasing fluid actuated brake means responsive to a controlled fluid pressure in the control chamber 63 of the relay (Figure 4). Cooperative with this portion of the relay I provide means for manually controlling the fluid pressure in chamber 63 from manually operated valve means and means for automatic control of fluid pressure in chamber 63 responsive both to supply line pressure below a predetermined value acting on the diaphragm 75 and control chamber pressure acting on the piston type actuator 69 such that the brake applying force increases from zero to a maximum as the supply line pressure decreases below the predetermined pressure to zero pressure to provide a modulated braking effect. In effect the diaphragm 75 and the actuator or piston 69 afford pressure responsive walls which move together. They may also be considered as a unitary movable wall having isolated fluid pressure responsive working surfaces in communication respectively with supply line pressure and control chamber pressure.

One advantage of my relay is that it is made in a two piece body housing such that the stackup of tolerances is maintained at a minimum and no manually adjustable means is required for the spring 74 to compensate for manufacture tolerances. A manually adjustable means for the spring biasing the emergency diaphragm is undesirable because it affords an opportunity for unskilled persons to tamper with the valve settings and possibly destroy the effectiveness of the emergency feature of the relay.

Another advantage is the fact that the manual and modulating emergency features of the relay have been incorporated with only two diaphragms and more important the only diaphragm in the relay (diaphragm 75) unbalanced by fluid pressures is a diaphragm infrequently used, that is, it is flexed only under emergency condition of the brake system. Those skilled in the art will understand that a fluid pressure balanced diaphragm, as for example diaphragm 59 balanced between control chamber and reaction chamber fluid pressures, can be made of thin material commensurate with long flex life, that is, a high number of flex cycles in the life of the diaphragm. This is possible because the diaphragm material is merely squeezed between the opposing fluid pressure forces. On the other hand a diaphragm unbalanced as to fluid pressures, as for example diaphragm 75, must be made of relatively thick and strong material to withstand the differential fluid pressure and for this reason is capable of a considerably shorter flex life. In my relay the diaphragm 59 requiring a long flex life because of its frequent use in normal braking is fluid pressure balanced and the diaphragm 75 requiring strength but not capable of such frequent flexing is unbalanced but disposed in the relay at a point where flexing is required only under the infrequent emergency brake condition.

A further advantage of my relay is found in the fact that the exhaust aperture 69f communicates with a passage 69c maintained clear of foreign material not only by a rubber exhaust passage cap but by the action of exhaust air in cleaning the passage 69c.

Another advantage of my relay is in its cooperative combination in a brake system to provide axle by axle protection for any single fault in the system and to do so with one less reservoir and relay than would normally be required.

Considering Figure 1 with a view to axle by axle protection it will be noted that upon loss of compressor 6, line 11, primary chamber A or supply lines 13, 14, 19, 23, 20, 21 or 22 connected to chamber A normal service braking remains effective on brake chambers 1, 2 and 3 and relays 51 and 52 effect emergency braking on brake chambers 4 and 5. All axles of the vehicle retain braking. Fluid pressure is retained in reservoirs 9 and 10 by way of the check valve 83 in relays 51 and 52.

For a fault in secondary chamber B or its associated supply lines 29, 30 and 33 brake chambers 1 and 2 are lost. Chambers 3, 4 and 5 are protected by relays 50, 51 and 52 for emergency braking responsive to drop in fluid pressure in chambers A and B. Thus, only the load axle associated with chambers 2 is lost. Fluid pressure is retained in reservoir 8 by way of the check valve 83 in relay 50.

For a fault in control lines 34, 36, 41, 37, 38 or 40 fluid pressure is lowered in chambers A and B on operation of the treadle 32 and relays 50, 51 and 52 effect emergency braking on brake chambers 3, 4 and 5. Brake chambers 1 and 2 are lost. Fluid pressure is retained in reservoirs 8, 9 and 10 by way of the check valves 83 in relays 50, 51 and 52.

For a complete fault in control lines 26, 27 or 28 operation of pedal 32 or hand valve 43 will quickly lower fluid pressure in chambers A and B to effect emergency braking on chambers 3, 4 and 5, chambers 2 being the only load axle brake chambers lost.

For a partial fault (slow leak) in control lines 26, 27 and 28 fluid pressure remains effective for all brake chambers until the loss through the control lines lowers the pressure in chambers A and B below a predetermined safe working pressure whereupon emergenry braking takes effect on chambers 3, 4 and 5.

In the event of a fault in brake chamber lines 1a or 2a or the chambers 1 or 2 the same condition results. That is, normal braking remains on all of the chambers until pressure in chambers A and B is lowered below a predetermined value at which time brake chambers 3, 4 and 5 are brought into emergency operation.

For a fault in brake chamber lines 3a, 4a or 5a or in brake chambers 3, 4 or 5 normal service brake operation maintains on all the axles except the axle associated with the line or brake chamber at fault. The restricting orifice 78 in the relays 50, 51 and 52 limit the fluid loss to a fault below a value which can be replenished by the compressor.

Also for a fault in the reservoirs 8, 9 or 10 or in the reservoir lines 31, 9a or 10a the restricting orifice 78 limits the loss of fluid pressure to a value readily replaceable by the compressor. Hence only the brake chambers associated with the particular reservoir or reservoir line are lost.

In other words, regardless of what single fault may occur in the brake system the relays 50, 51 and 52 through the emergency feature of the relay combined with the check valve and restricting orifice innovation are capable of limiting the load axle braking loss to one load axle and of accomplishing this feature with one less relay and one less reservoir than the number of load axles.

It should be noted that while I have shown in Figure 1 a preferred embodiment of my brake system as applied to a tractor and semi-trailer combination in which the tractor load axle brake chambers 2 are actuated through a quick application and release valve device 39, this particular location of device 39 is not required for axle by axle protection. That is, the device 39 could be interchanged with any of relays 50, 51 and 52 with their associated reservoirs such that chambers 3, 4 or 5 were supplied through the device 39 and chambers 2 supplied through one of my improved relays.

Should supply line pressure be lowered to the extent that emergency braking prevents moving the vehicle after it has been stopped, it is desirable that means be provided for releasing the emergency brakes on the trailer in an emergency. For example, should the supply line pressure have dropped sufficiently rapidly that the vehicle inadvertently comes to a stop on a railroad crossing or just over the crest of a hill, it is desirable to move the vehicle to a safe location.

In this respect and for additional reasons to be mentioned hereinafter, I provide connected in the trailer line 20 and to a line 48 leading to the trailer reservoir 8, a hand operated emergency valve 49 best seen in Figures 7a to 7d inclusive.

Figure 7A:
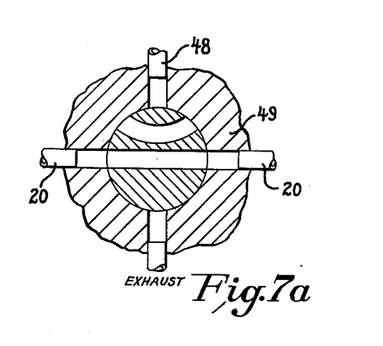
Figures 7a to 7d are diagrammatic views of an emergency hand valve employed in my brake system.
Figure 7B:
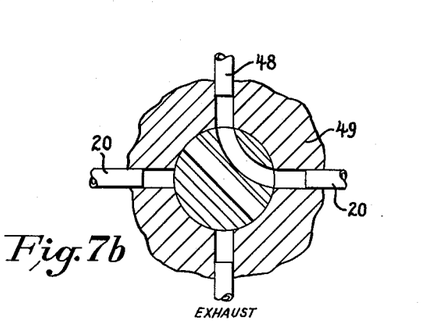

In Figure 7a the valve 49 is shown in normal position providing communication through adjacent sections of supply line 20. Should fluid pressure in supply line 20 leading to the trailer be lowered to the extent that trailer brake chambers 4 and 5 will not allow the tractor to move the trailer, in an emergency the hand valve 49 may be shifted to the position shown in Figure 7b thereby replenishing fluid pressure in trailer supply line 20 from the reservoir 8 to release chambers 4 and 5.

Figure 7C:
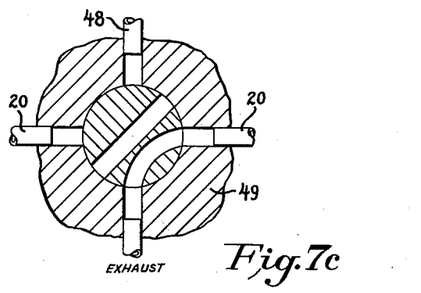
Figure 7D:
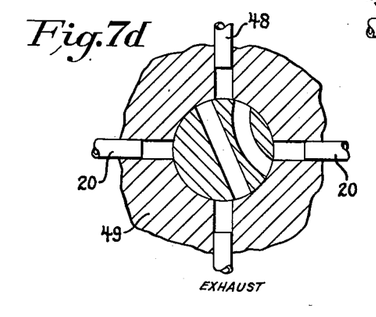

Referring to Figure 1 and Figure 7c should a fault occur in treadle 32 thereby interfering with manual application of chambers 1 to 5 inclusive, or should a fault in break-a-way valve 25 interfere with manual application of trailer chambers 4 and 5, or should it otherwise be desired to operate chambers 4 and 5 on the trailer independently of the tractor brake chambers, such operation by the driver is provided for through valve 49 turned to the position in Figure 7c wherein trailer line 20 is connected to exhaust through valve 49. In this manner partial or full braking of the trailer through chambers 4 and 5 may be effected. As shown in Figure 7d a position is provided in the valve 49 for holding any particular pressure desired in line 20 leading to the trailer. This holding device may be used on a down hill grade or as a means for applying the trailer brakes more fully than the tractor brakes are applied.

While I have shown and described a preferred embodiment of my invention, it will be obvious to those skilled in the art that various changes and modifications can be made without departing from my invention in its broader aspects and I, therefore, aim in the appended claims to cover all such changes and modifications as fall within the true spirit and scope of my invention.

What I claim as new and desire to secure by Letters Patent of the United States is:

1. In a fluid pressure brake system for a tractor-trailer vehicle having a plurality of load axles the combination comprising a source of fluid under pressure on the tractor, fluid pressure responsive brake actuators for said tractor and trailer axles, supply and control lines connected to said source, a plurality of relays connected one to the brake actuators of each load axle except one and to said supply and control lines, a plurality of reservoirs connected one to each relay, said relays each having a check valve to prevent feed back from its associated reservoir to said supply lines and a restricted orifice to limit the rate of drain on said supply line in the event of a fault beyond said relay both adjacent the connection of said relay to said supply line, said relays each including a first valve means for passing fluid under pressure from an associated reservoir to associated brake chambers and releasing fluid under pressure from the latter to atmosphere, a control chamber communicating with said control line, a pilot diaphragm forming part of said control chamber and being responsive to fluid pressure in said control lines for actuating said valve means, said relays also including a second valve means movable to supply fluid from the associated reservoir to said control chamber to effect emergency braking, spring means for moving said valve means, means for resisting said spring means including first and second isolated wall portions movable as a unit and being responsive to pressure in an associated supply line and said control chamber, respectively, said spring means being operative to move said second valve means when the pressure on said first wall portion falls below a predetermined minimum to initiate emergency braking and to increase the pressure on said second wall portion for retarding additional emergency braking, manually operated valve means connected in said supply and control lines to effect manual operation of said brake actuators by controlling fluid pressure in said control lines, and double acting check valve means in said relays adjacent said control line connection to isolate said relays from said control lines on emergency braking.

2. In a fluid pressure brake system for a tractor-trailer vehicle having a plurality of load axles the combination comprising a source of fluid under pressure on the tractor, fluid actuated brake applying means for said tractor and trailer axles, supply and control lines connected to said source, a plurality of relays connected one to the brake actuators of each load axle except one and to said supply and control lines, a plurality of reservoirs connected one to each relay, said relays each having a check valve to prevent feed back from its associated reservoir to said supply lines and a restricted orifice to limit the rate of drain on said supply line in the event of a fault beyond said relay both adjacent the connection of said relay to said supply line, said relays each comprising a first valve means arranged respectively to control the passage of fluid under pressure from said reservoir to said brake applying means and from the latter to exhaust, a fluid pressure responsive diaphragm for actuating said first valve means and defining in said relay a reaction chamber in communication with said applying means and a control chamber, said diaphragm being responsive to prevailing control chamber pressure to pass fluid under pressure to said brake applying means responsive to a balance of control and reaction chamber pressures to maintain a fluid pressure in said brake applying means substantially equal to said control pressure and responsive to prevailing reaction chamber pressure to release said brake applying pressure to atmosphere, means for manually controlling said control chamber pressure including a manually operated valve connected to said supply and control lines, means for automatically controlling said control chamber pressure inversely as a function of supply line pressure below a predetermined pressure comprising a second valve means movable in one direction to admit fluid under pressure from the associated reservoir to said control chamber and movable in the other direction to exhaust fluid to the atmosphere, a movable wall for actuating said second valve means, spring means biasing said wall in one direction, said wall being movable in the other direction in response to fluid under pressure from said supply line and said control chamber reacting on isolated portions of said wall, and a double acting check valve communicating with said control chamber, said control line and through said second valve means with said reservoir to supply fluid under pressure to said control chamber from said control line and reservoir in the alternative while maintaining isolation of said control line and reservoir.

3. In a fluid pressure brake system having fluid actuated motors for applying the brakes, a supply source and a reserve source of fluid pressure, a relay valve controlling delivery of fluid pressure from said reserve source to said motors to apply the brakes and from the latter to the atmosphere to release the brakes, said relay valve including a control chamber responsive to selected amounts of fluid pressure from said supply source to actuate said relay valve, emergency valve means fluid connected to said control chamber, said sources and the atmosphere and being movable in opposite directions from a position in which said control chamber is out of communication with said reserve source and the atmosphere to a position permitting delivery of pressure fluid from said reserve source to said control chamber to actuate said brake motors and to a position permitting exhaust of fluid from said control chamber to the atmosphere to release said brake motors, an actuator member engageable with said valve means to move the latter, spring means for establishing a predetermined force urging said member in one direction, said member presenting a pair of isolated pressure responsive surfaces acted on, respectively, by fluid under pressure from said supply means and fluid under pressure from said control chamber to move said valve means in the other direction and establish an increasing pressure in said control chamber and on one of said walls to gradually increase the pressure at said brake motors as the pressure in said supply means and on the other of said walls decreases below a predetermined minimum established by said spring means.

4. In a fluid pressure brake system having fluid actuated means for applying the brakes, a supply source and a reserve source of fluid pressure, a relay valve controlling delivery of fluid pressure from said reserve source to said fluid actuated means to apply the brakes and from the latter to the atmosphere to release the brakes, said relay valve including a control chamber responsive to selected amounts of fluid pressure from said supply source to actuate said relay valve, the combination of a valve chamber communicating with said source, the atmosphere and said control chamber, valve means including supply and exhaust valve elements disposed in said valve chamber for movement as a unit from a lap position in which communication between said control chamber and said reserve source is prevented by said supply element and communication between said control chamber and the atmosphere is prevented by said exhaust valve element, said valve means being movable in one direction against the pressure in said reserve source to open said supply valve element and admit fluid from said reserve source to said control chamber to apply said brakes and in the other direction to open said exhaust valve element and permit exhaust of fluid from said control chamber to the atmosphere to release said brakes, means for moving said valve means including a movable member presenting a first pressure responsive wall communicating with said supply means and a second pressure responsive wall communicating with said control chamber to urge said member in a direction permitting movement of said valve means in said other direction, and spring means acting in opposition to the pressures in said supply means and said control chamber acting on said first and second pressure responsive walls, respectively, and the pressure in said reserve source acting on said supply valve element to move said valve means in said one direction when pressure in said supply means decreases below a predetermined minimum to increase the pressure in said control chamber, said first pressure responsive wall having a pressure responsive area greater than the area of said supply valve element and less than the pressure responsive area of said second responsive wall.

5. In a fluid pressure brake system having fluid actuated means for applying the brakes, a supply source and a reserve source of fluid pressure, a relay valve controlling delivery of fluid pressure from said reserve source to said fluid actuated means to apply the brakes and from the latter to the atmosphere to release the brakes, said relay valve including a housing forming a control chamber responsive to selected amounts of fluid pressure from said supply source to actuate said relay valve, the combination of a supply chamber formed in said housing and adapted to receive fluid under pressure from said supply source, a valve chamber adjacent to said supply chamber and connected to the latter, said reserve source and control chamber, valve means movable in a supply direction to admit fluid from said reserve source to said valve chamber and in an exhaust direction to exhaust fluid from said valve chamber to the atmosphere, an actuator member having opposite ends disposed in said valve chamber and said supply chamber to prevent communication therebetween and being engageable with said valve means to move the latter, spring means operatively engaged with said member to bias the latter in one direction, a diaphragm forming one wall of said supply chamber and being connected to one end of said member and being responsive to pressure in said supply chamber to move said member against said spring and close said valve means to release the pressure in said brake applying motors when the pressure in said supply chamber exceeds said predetermined pressure, said member forming a movable wall in said valve chamber responsive to pressure in said control chamber to urge said member against the bias of said spring, said spring being effective to move said valve means in a supply direction and said diaphragm and said movable wall being responsive to pressure in said supply chamber and said control chamber, respectively, to move said valve means in said exhaust direction, whereby the pressure in said control chamber is increased from atmospheric to a maximum pressure available in said reserve source inversely as the pressure in said supply chamber decreases below said predetermined minimum to atmospheric.

6. In a fluid pressure brake system having fluid actuated means for applying the brakes, a supply source and a reserve source of fluid pressure, a relay valve controlling delivery of fluid pressure from said reserve source to said fluid actuated means to apply the brakes and from the latter to the atmosphere to release the brakes, said relay valve including a control chamber responsive to selected amounts of fluid pressure from said supply source to actuate said relay valve, the combination of a valve chamber communicating with said control chamber, with said reserve source of fluid under pressure, and with the atmosphere, valve means movable from a lap position preventing communication between said reserve source and said valve chamber and between said valve chamber and the atmosphere, said valve means being movable in one direction to admit fluid from said reserve source to said valve chamber, spring means for moving said valve means in said one direction, means for resisting said spring means including a first wall responsive to pressure in said supply means, a second wall responsive to pressure in said valve chamber, said first and second wall being movable as a unit, said spring means being operative when the pressure in said supply means and on said first wall decreases below a predetermined minimum to move said valve means in said one direction to initiate admission of fluid from said reserve source to said control chamber to increase the pressure on said second wall to urge said valve means to said normal position for retarding additional emergency braking.

7. In a fluid pressure brake system having fluid actuated means for applying the brakes, a supply source and a reserve source of fluid pressure, a relay valve controlling delivery of fluid pressure from said reserve source to said fluid actuated means to apply the brakes and from the latter to the atmosphere to release the brakes, said relay valve including a control chamber responsive to selected amounts of fluid pressure from said supply source to actuate said relay valve, the combination of a valve chamber communicating with said reserve source of fluid under pressure, with said control chamber, and with said supply source, a movable actuator having one portion supported in said valve chamber to prevent communication between said valve chamber and said supply source, passage means in said actuator placing said valve chamber in communication with the atmosphere, a supply valve element controlling admission of fluid from said reserve source to said valve chamber, an exhaust valve element engageable with said passage means to prevent exhaust of fluid from said valve chamber to the atmosphere, said supply valve element and exhaust valve element being movable as a unit in one direction to close said exhaust valve element and to open said supply valve element and being movable in the other direction to close said supply valve element and open said exhaust valve element, spring means urging said actuator in said one direction, a diaphragm connected to said actuator for movement in response to pressure in said supply source, said actuator presenting a movable wall portion in said valve chamber responsive to fluid pressure therein and in said control chamber to urge said actuator in said other direction, said spring means being operable to open said supply valve element and close said exhaust valve element when the pressure in said supply source and on said diaphragm decreases below a predetermined minimum pressure to admit fluid from said reserve source to said valve chamber and said control chamber to initiate emergency braking whereby fluid in said valve chamber acts on said wall portion to resist said spring means and delay full application of said emergency braking.

8. An emergency relay valve mechanism for actuating fluid operated brakes and having a housing, said housing presenting a supply port adapted for connection to a supply source of fluid pressure, a reserve supply port adapted for connection to a reserve source of fluid under pressure, an exhaust port communicating with the atmosphere and a delivery port adapted for connection to brake applying motors; relay valve means movable to control the flow of fluid pressure from said reserve supply port to said delivery port and from the latter to the atmosphere for applying and releasing brakes; diaphragm means forming a control chamber in said housing and being movable in response to fluid pressure to move said relay valve means; emergency valve means including a valve chamber formed in said housing and communicating with said reserve port, control chamber, exhaust port and supply port; a supply valve element controlling admission of fluid pressure from said reserve port to said valve chamber and said control chamber, an exhaust valve element controlling flow of fluid pressure from said valve chamber and control chamber to said exhaust port, said supply valve element and exhaust valve element being movable as a unit in one direction to close said exhaust valve element and to open said supply valve element and being movable in the other direction to close said supply valve element and open said exhaust valve element, a movable actuator having one portion supported in said valve chamber to prevent communication between the latter and said supply port and being engageable with said valve elements, spring means urging said actuator in said one direction, a diaphragm connected to said actuator for movement in response to pressure in said supply port, said actuator presenting a movable wall portion in said valve chamber responsive to fluid pressure therein and in said control chamber to urge said actuator in said other direction, said spring means being operable to open said supply valve element and close said exhaust valve element when the pressure in said supply port and on said diaphragm decreases below a predetermined minimum pressure to admit fluid from said reserve port to said valve chamber and said control chamber to initiate emergency braking whereby fluid in said valve chamber acts on said wall portion to resist said spring means and restrain opening of said supply valve element to delay full application of said emergency braking.

References Cited in the file of this patent
UNITED STATES PATENTS

| | | |
|---|---|---|
| 2,411,406 | Affleck | Nov. 19, 1946 |
| 2,441,050 | Wilgers | May 4, 1948 |
| 2,636,576 | Affleck | Apr. 28, 1953 |